United States Patent [19]

Ausnit

[11] 4,430,070
[45] Feb. 7, 1984

[54] METHOD OF AND APPARATUS FOR UNINTERRUPTEDLY ASSEMBLING COMPONENTS FOR MAKING BAGS

[75] Inventor: Steven Ausnit, New York, N.Y.

[73] Assignee: Minigrip, Inc., Orangeburg, N.Y.

[21] Appl. No.: 291,966

[22] Filed: Aug. 11, 1981

[51] Int. Cl.³ .......................... B31B 1/64; B31B 1/90
[52] U.S. Cl. .................................. 493/215; 493/381; 493/927
[58] Field of Search .............. 493/215, 214, 213, 927, 493/381, 346; 150/3; 156/583.1, 583.2

[56] References Cited

U.S. PATENT DOCUMENTS

| Re. 28,969 | 9/1976 | Naito | 150/3 |
| 3,219,084 | 11/1965 | Ausnit et al. | 493/215 X |
| 3,347,298 | 10/1965 | Ausnit et al. | 150/3 |
| 3,839,128 | 10/1974 | Arai | 156/583 |
| 3,948,705 | 4/1976 | Ausnit | 156/73.4 |
| 3,986,914 | 10/1976 | Howard | 493/214 X |

FOREIGN PATENT DOCUMENTS

| 595874 | 4/1934 | Fed. Rep. of Germany . |
| 1587609 | 4/1981 | United Kingdom . |

Primary Examiner—James F. Coan
Attorney, Agent, or Firm—Hill, Van Santen, Steadman & Simpson

[57] ABSTRACT

Reclosable, separable fastener bags having openable mouths defined by pull flanges are made by providing wall panel sheet material having pull flange area along an edge, uninterruptedly assembling and joining a base surface of substantial width on a preformed extruded plastic resiliently flexible interlocking fastener profile closure strip in face-to-face assembly relation with a surface of the wall panel material along the inner side of the pull flange area, and in the continuous advance of the assembly uninterruptedly securing a minor width portion of the base surface adjacent to the pull flange area as a hinge attachment to the wall panel material but leaving the remainder of the base surface free so that the strip is adapted to swing hingedly relative to the wall panel material, thus permitting the strip to swing hingedly relative to the wall panel due to force exerted against the wall panel from within the bag, but permitting quick separation of interlocked fastener profiles for opening the bag in response to separation pull on the pull flanges.

18 Claims, 7 Drawing Figures

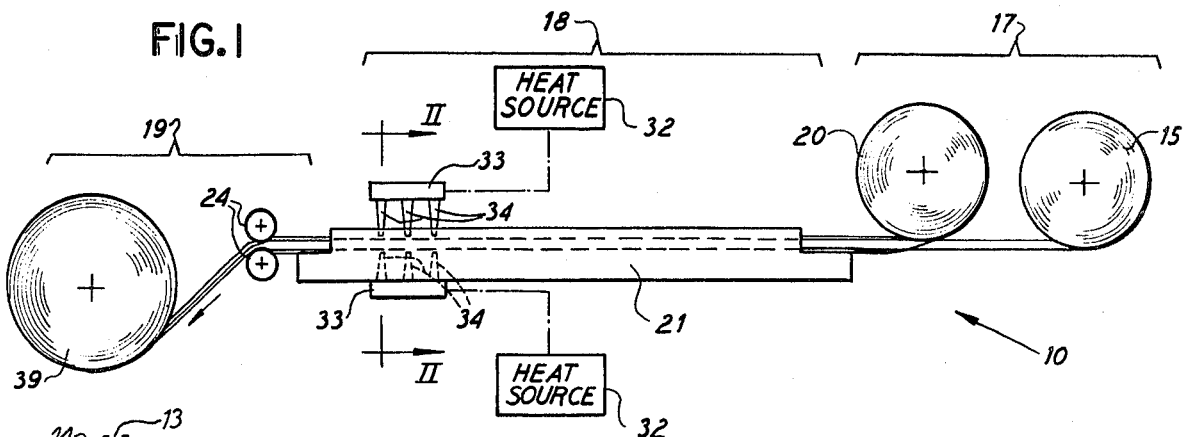
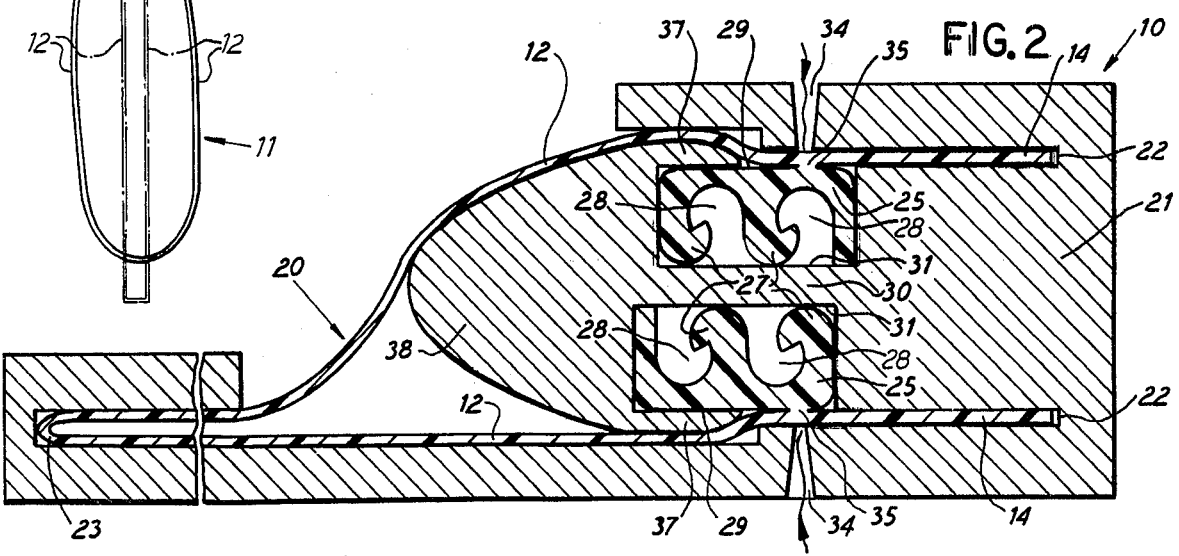
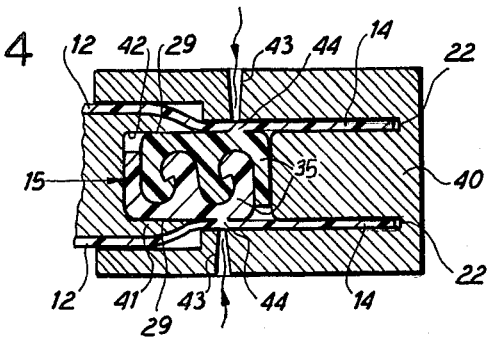
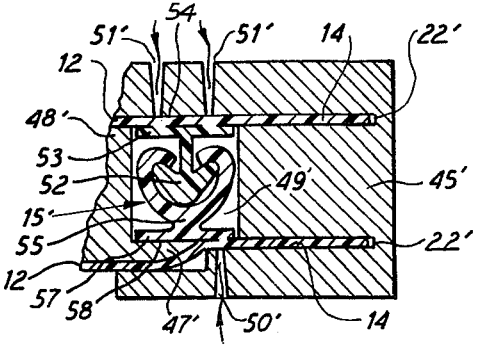
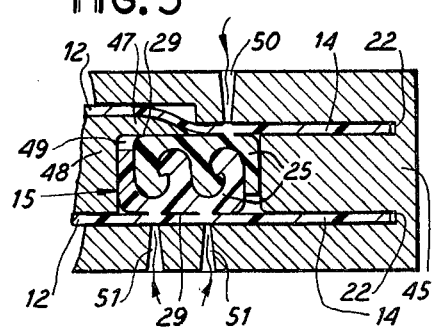

METHOD OF AND APPARATUS FOR UNINTERRUPTEDLY ASSEMBLING COMPONENTS FOR MAKING BAGS

This invention relates to the bag making art, and is more particularly concerned with a method of and apparatus for uninterruptedly assembling and securing components for making bags of the kind having reclosable, interlocking profile extruded plastic fasteners.

Bags equipped with reclosable, extruded plastic profile fasteners have the great advantage of being easily closable by pressing the fasteners together, and easily openable by pulling the fasteners apart. As an aid in separating the fasteners, the bags are generally equipped with pull flanges which project outwardly away from the fastener profiles and define a mouth for the bag opening.

A problem that has been long recognized in respect to bags having the resiliently flexible profile fasteners, sometimes referred to as zippers, is that if internal expansion pressure such as may be exerted on the bag walls by a load of contents, or entrapped air, is permitted to exert opening pull on the fastener profiles, the bags may be unintentionally opened. To eleviate this problem, it has been heretofor proposed, as represented in U.S. Pat. No. 3,948,705, that one of the fastener profiles be part of a fastener strip attached to the associated bag wall in such a manner that the fastener strip will serve as a hinge permitting hinging of the fastener away from the bag wall when the bag walls expand from internal pressure. Such an arrangement requires that in addition to the body of the fastener strip having the profiles, there must be a lateral flange extension of the strip to provide the hinge connection.

Another proposal as found in U.S. Pat. No. 3,347,298 has been to extrude the flexible fastener profiles integrally in one piece with the bag wall material, and have the base attachment of the male profile portion of the fastener assembly offset outwardly so that there is, in affect, a hinging action at the base of the male profile. However, such an arrangement is subject to another problem, in that for extremely thin plastic bag body material usually referred to as plastic film in contrast to the relatively large modulous section of the fastener profiles, encounters a troublesome setting time differential during extrusion of the material, or as in U.S. Pat. No. Re. 28,969 and other single track profiles where the necessity of an assymetric profile requires fairly close tolerances to differentiate between the inside and outside closing forces.

It is, accordingly, an object of the present invention to provide a new and improved high volume production method and an apparatus for uninterruptedly assembling components for making bags having sheet material wall panels, an openable mouth defined by pull flanges adapted to be pulled apart for opening the bags, and interlocking profiles, with the bags having a construction that eliminates any need for a hinge flange extension on the profile fastener strip, and also avoids the one piece fastener and bag wall extrusion problems, but nevertheless attains the advantage of enabling a hinging movement of at least one of the performed extruded plastic interlocking fastener profile closure strips that is carried on the bag wall panel material.

The present invention provides a method of uninterruptedly assembling components for making reclosable bags having sheet material wall panels and an openable mouth defined by pull flanges adapted to be pulled apart for opening the bags, continuously advancing and guiding and joining a base surface of substantial width on a preformed extruded plastic resiliently flexible interlocking fastener profile closure strip in face-to-face relation with a surface of said wall panel material along the inner side of the pull flange area, and continuously securing a minor width portion of said base surface adjacent to said pull flange area to said wall panel material as a hinge attachment but leaving the remainder of said base surface free so that said strip is adapted to swing hingedly relative to said wall panel material.

This invention also provides an apparatus for uninterruptedly assembling components for making bags having opposed sheet material wall panels and an openable mouth defined by pull flanges adapted to be pulled apart for opening the bags, with means for supporting wall panel sheet material having a pull flange area along an edge, means for continuously advancing and guiding and joining a base surface of substantial width of a preformed extruded plastic resiliently flexible interlocking fastener profile closure strip in face-to-face relation to a surface of said wall panel material along the inner edge of a pull flange area of the material, and means for continuously securing a minor width portion of said base surface adjacent to said pull flange area to said wall panel material as a hinge attachment but leaving the remainder of said base surface free so that said strip is adapted to swing hingedly relative to said wall panel material.

Other objects, features and advantages of the present invention will be readily apparent from the following description of certain representative embodiments thereof, taken in conjunction with the accompanying drawing, although variations and modifications may be effected without departing from the spirit and scope of the novel concepts embodied in the disclosure, and in which:

FIG. 1 is a schematic illustration of production line apparatus for practicing the invention;

FIG. 2 is an enlarged fragmental sectional detail view taken substantially along the line 2—2 of FIG. 1;

FIG. 3 is a small scale illustration of a bag embodying the invention;

FIG. 4 is a fragmentary sectional detail view similar to FIG. 2 but showing a modification;

FIG. 5 is a similar sectional detail view showing another modification;

FIG. 6 is a similar sectional detail view showing yet another modification; and

FIG. 7 is a fragmental sectional detail view showing still another modification.

In FIGS. 1 and 2, apparatus 10 is shown for assembling components for making bags 11 as represented in FIG. 3. Such bags have sheet material wall panels 12 and an openable mouth 13 defined by pull flanges 14 adapted to be pulled apart for opening the bag. Normally the bag 11 is maintained closed by means of a separable fastener 15 along the inner ends of the pull flanges 14. The bag 11 is adapted to be in a collapsed condition as represented by the dash phantom outline in FIG. 3, and when the bag is filled, the wall panels 12 are adapted to expand as indicated in the full line condition illustrated in FIG. 3. This expanded condition, if not taken into account in the relationship of the separable fastener 15 to the wall panels, would tend to impose a fastener separating strain on the fastener parts. However, herein the arrangement is such that at least one of the fastener parts is adapted to swing hingedly relative to the associated wall panel, so that internal pressure or stress opening of the fastener closure is avoided.

In a desirable arrangement, the apparatus 10 comprises a supply station 17 (FIG. 1), a working station 18, and a takeoff station 19, and bag making product is adapted to be produced in a continuous stream manner. To this end, sheet material 20 is supplied from a source at the supply station which may be directly from an extruder of plastic film where that is feasible, but may be, as shown, supplied from a roll 20 suitably located at the supply station 17. Similarly, preformed extruded plastic resiliently flexible interlocking fastener profile closure strip 15 may, if feasible, be supplied directly from an extruder but, as shown in FIG. 1, may be supplied from one or more rolls located at the supply station 17. The arrangement is such that the fastener profile strip 15 and the bag wall panel sheet material 20 are adapted to be supplied to the working station 18 in a coordinated relation for efficient assembling of these components and joining thereof at a fairly high production rate.

In the working station 18, the sheet material 20 is supported by means comprising a supporting and guide structure 21 which also serves for guiding and joining the fastener strip into proper relation and orientation with respect to the sheet material. The sheet material 20 may be supplied to the work station in folded condition or may be folded at the upstream end of the working station in order to provide the bag wall panels 12. If preferred, of course, the sheet material 20 may be supplied as two separate panel strips where it is desired to provide initially bottom end open bags for filling through the bottom end, although for the most part top openings bags are preferred and wherein the bottom is comprised of the fold joining the two wall panels. In any event, the supporting and guide structure 21 has spaced guide slots 22 for guided running of the respective pull flange areas 14 of the sheet material. A guide slot 23 at the opposite side of the guide structure 21 controls guided running of the folded bag bottom portions of the sheet material 20. It will be observed that the inner ends of the slots 22 and 23 are defined by guide walls whereby the folded sheet material 20 is controlled against lateral deflection from the desired direction of flow as it is pulled through the guideways provided by the structure 21, by means at the take-off station 19 comprising preferably suitably driven cooperating take-off pinch rolls 24.

As supplied from the supply station 17, the fastener profile strip 15 may comprise a pair of identical complementary resiliently flexible preformed plastic profile strips 25, each of which has a plurality of hook headed spaced parallel ribs 27 and corresponding complementary grooves 28 within which the hook ribs of the companion fasteners strip 25 is adapted to be interlockingly engaged. By virtue of the resilient flexibility of the material of the fasteners strips 25, the interlocking profiles 27 are adapted to be pressed together into a closed relationship and are adapted to be separated by a reverse action. Each of the fastener strips 25 has a base surface 29 of substantial width extending throughout substantially the full width of the fastener strip.

Within the supporting and guide structure 21, the separable fastener strips 25 are united with the sheet material 20, and more particularly, the base surfaces 29 of the fastener strip are joined in face-to-face relation with selected surfaces of the wall panel material 12. To this end, the guide slots 22 are spaced apart sufficiently to spread the wall panel sheet material 12 and the pull flange areas 14 for accomodating the profile fastener strips 25 therebetween. In one desirable relationship, the fastener strips 25 are separated by intervening means comprising a separator web 30 and guided in respective grooves 31 provided by the structure 21 along opposite guide faces of the separator 30. As observed in FIG. 2, the fastener guide grooves 31 are offset relative to one another sufficiently to accomodate the fastener strips 25 in a directly separated but aligned relation from which the fastener strips can be rejoined with one another by joining pressure exerted simultaneously against the back surfaces 29 of the fastener strips. Thus, as the joined fastener strip material is received from the supply station 17 into the structure 21, the fastener strips 25 are separated and run in their individual guide grooves 31 which are of a depth complementary to the thickness of each of the strips 25 and so related to the guide slots 22 that the base surfaces 29 of the strips are substantially in a plane with the adjacent surfaces defining the slots 22, thereby facilitating joining of the base surfaces 29 with the confronting surfaces of the sheet material. As the sheet material 20 and the fasteners 25 advance in proper joined alignment through the supporting and guide structure 21, the base surfaces 29 and the confronting sheet material parts are secured together and at least one of the base surfaces is secured only along a minor width portion thereof adjacent to the associated pull flange area so as to form a hinge attachment to the wall panel material but leaving the remainder of the base surface free so that the fastener strip is adapted to swing hingedly relative to the wall panel material. In the embodiment illustrated in FIG. 2, both of the fastener strips 25 are secured in this manner. The securement is effected continuously and without interrupting the continuous fairly high speed travel of the co-running sheet material and fastener strips. One way in which this is accomplished comprises focus of heat of proper intensity through the plastic sheet material to the selected minor width portion of the base surface 29 of each of the fastener strips 25. The heat may be applied by any suitable means such as hot air. By way of example, the hot air may be supplied for securing each of the fasteners 25 from a respective heat source 32 connected to a manifold 33 in each instance and which distributes the heat selectively through one or preferably a plurality of nozzle ports 34 to the selected fusion point. As shown in FIGS. 1 and 2, the nozzle ports 34 are located in alignment along the path of travel of the assembly of plastic components whereby the applied heat can effect the desired fusion temperature within narrow focus limits. In other words, as the narrow band to be fused progresses past the successive nozzle orifices 34, there is progressive but rapid attainment of fusing temperature along the fusion band whereby as the stripe or band of the assembled plastic components reaches the last of the series of nozzle ports 34 complete fusion securement 35 is attained as represented in FIG. 2.

In order to assure confinement of the securing fusion to the minor width portion of the base surface adjacent to the pull flange area in each instance, the major width portions of the base surfaces 29 are maintained separated from the wall panel sheet material 12. Means for this purpose comprise respective separator flanges 37 which project from a contoured longitudinally extending separator bar 38 integral with the fastener separator 30. Each of the separator flanges 37 is desirably tapered at its distal edge toward the surface which overhangs the adjacent guide groove 31 and functions as part of the guide groove track for the fastener strip 25 in that track. In addition to its separator function, each of the flanges 37 cooperates with the adjacent portions of the structure 21 as a heat sink to absorb heat from the fusing system which may escape the relatively narrow fusion band along the assembled plastic components being secured together.

Downstream from the place at which fusion is effected in the working area 18, the fusion secured components move through the guide track system for a sufficient length of travel to assure complete setting of the fusion bands 35 before the secured assembly reaches the take-off rolls 24 which serve also as fastener rejoining means for pressing the fastener profiles back into interlocking relation. From the rolls 24, the assembled bag material components may go directly to apparatus for separating the assembly into individual bags, or may be wound into a roll 39 for furture use.

If it is desired to secure the plastic fastener strip components and the bag wall sheet material together without separating the fastener strips from one another, the arrangement shown in FIG. 4 may be employed. There a supporting and guide structure 40 provided with guide grooves 22 for a pull flange areas 14 of the plastic sheet material wall panel areas 12 defines with separator flanges 41, corresponding to the separator flanges 37 of FIG. 2, a guide track channel 42 for the unseparated resiliently flexible fastener strip 15. Heat focusing nozzle ports 43, corresponding to the nozzle ports 34 of FIG. 2, focus hot fusing air to a narrow fusedly securing band 44 longitudinally along a minor width portion of the respective base surfaces 29 of the closed fastener strips 25 adjacent to the pull flange areas 14 whereby to provide hinge attachment of the fastener strips to the wall panel sheet material 12 while the remainder of the base surfaces remain free from securement.

In FIG. 5 is shown an arrangement wherein the base surface of one of the fastener strips is substantially fully secured to the wall panel sheet material while the base surface of the other of the fastener strips is secured in a hinged manner to its associated sheet material wall panel. In the arrangement of FIG. 5, a supporting and guide structure 45 similar to the guide structures 21 and 40, has grooves 22 for the pull flanges 14 and cooperates with a separator flange 47 and sheet material wall panel separator 48 to define a track channel 49 for the closed, unseparated plastic separable fastener strip 15. In this instance, there is only one of the separators 47 along one of the fastener base surfaces 29 and that base surface is secured along a minor width portion thereof adjacent to the contiguous pull flange area 14 as a hinge attachment by means of a fusing medium such as hot air delivered through one or more heat focusing nozzle ports 50. On the other hand, the base surface 29 of the other fastener strip 25 is substantially fully secured to the contiguous wall panel 12 as by means of a plurality of heat focusing means located at a plurality of intervals across the width of the affected surface 29.

It will be appreciated, of course, that if it is desired to have only one of the fastener strips 25 hingedly attached to its associated wall panel 12, in the arrangement of FIG. 2, then substantially the same means as described for FIG. 5 may be employed for attaching the base surface of the other of the fastener strips in FIG. 2.

The present invention is adaptable for various geometrical configurations of resiliently flexible fastener strips, one such configuration having been shown in FIGS. 2, 4 and 5. For some purposes the substantial arrow shaped rib and socket separable fastener arrangement of FIG. 6 may be preferred. In this arrangement, a fastener strip 15' comprises a symetric arrow head cross-section male profile strip 52 having a base flange 53 approximately of equal distance along both sides of the longitudinal axis of the strip and providing a base surface 54 of substantial width. A complementary female profile has a similar base flange 57 providing a base surface 58 of substantial width.

Although both of the base surfaces 54 and 58 of the separable fastener 15' may be secured along only a minor width portion to the pull flange areas 14 of the bag wall sheet material panels 12, similarly as in FIG. 4, the arrangement selected for illustration and FIG. 6 is similar to FIG. 5 in that only one of the fastener base flanges is secured along a minor width portion, in this instance the base flange 58, although if preferred it could be the base flange 54. Details of the supporting and guide structure 45' are substantially the same as described in respect to the structure 45 in FIG. 5, and therefore the description with respect to the structure 45 in FIG. 5 is incorporated here by reference and corresponding ' referenced numerals have been applied.

By way of example of a heat delivery system other than heated air, FIG. 7 is referred to, showing a hot wire 59 for generating radiant heat focused as by means of a reflector 60 which may comprise a cavity of semicylindrical or parabolic configuration whereby efficiently to focus the radiant heat to the select limited width fusing band portion of the plastic component assembly. Desirably the cavity 60 and its reflecting surface are provided in or are part of an insulated insert 60 carried by the supporting and guide structure 45 which in other respects may be substantially the same as in FIG. 5 and therefore, the description of elements to which common reference numerals have been applied, the description of FIG. 5 is incorporated by reference in respect to FIG. 7. Although the radiant heat delivery system has been shown to relate to only one base surface of the separable fastener 15, it will be appreciated that an arrangement similar to either of FIGS. 2 or 5 may be employed with respect to the other side of the assembly where either a minor width portion of the base surface adjacent to the pull flange area is secured as a hinge attachment or a plurality of points transversely of the width of the base surface may be attached for, in effect, substantially full attachment of the base surface. In any event, similarly as in connection with FIGS. 2 and 5, as the bag components comprising the sheet material wall panels 12 and the interlocking fastener profile closure strip assembly 15 travel continuously through the supporting and guide structure 45, radiant heat produces a fusion weld 35 along the minor width portion of the base surface 29 adjacent to the pull flange area 14 and thereby creates a hinge attachment of the fastener strip 25 to the wall panel material 12, leaving the remainder of the base surface free, so that the strip is adapted to swing hingedly relative to the wall panel material.

While only hot air and radiant heat delivery systems have been particularly illustrated and described, it will be apparent that other types of focused heat delivery or generating systems may be employed as will be readily apparent. The technology in focused energy for selectively heating narrow controlled areas of members to be joined has evolved rapidly in recent times and cost factors are improving so that for high speed operation and large volume production other forms of focused energy heat delivery systems than those specifically applied herein, i.e. focused hot air, and focused radiant energy, may be feasible for securing the assembled bag making components.

It will be understood that variations and modifications may be effected without departing from the spirit and scope of the novel concepts of this invention.

I claim as my invention:

1. A method of uninterruptedly assembling components for making bags having sheet material wall panels and an openable mouth defined by pull flanges adapted to be pulled apart for opening the bags providing preformed wall panel sheet material having a pull flange area along an edge;

providing a preformed extruded plastic flexible interlocking closure strip, having opposite faces one of which has profile means adapted for separable interlocking with complementary profile means on another closure strip and the other face providing a base surface of substantial width directly opposite said profile means;

continuously longitudinally advancing both said sheet material and said fastener strip at the same speed and guiding said fastener strip to cause said base surface to engage in face-to-face relationship with the surface of said wall panel material along the inner side of the pull flange area and substantially spaced from said edge;

and continuously securing a minor width longitudinally extending portion of said base surface adjacent to said pull flange area as a hinge attachment to said wall panel material but leaving the remainder of said base surface inwardly from the secured minor width portion free from said wall panel material so that said strip is adapted to swing hingedly relative to said wall panel material.

2. A method according to claim 1, comprising effecting said securing by focusing fusing energy to said sheet material at said minor width portion.

3. A method according to claim 2, comprising focusing hot air to provide the fusing energy.

4. A method according to claim 2, comprising supplying the fusing energy from a radiant energy source.

5. A method according to claim 1, comprising maintaining said wall panel material separated from said remainder of said base surface while effecting securing of said minor width portion.

6. A method according to claim 1, which comprises effecting continuous guided co-travelling of said sheet material and joined closure strip past a focused fusing energy source and thereby effecting said securing.

7. A method according to claim 1, wherein said sheet material has two pull flange areas along two edges and there being two of said fastener profile closure strips both of which have a base surface of substantial width, and securing respective minor width portions of said base surfaces adjacent to said pull flange areas as a hinge attachment to the wall panel material but leaving the remainder of both of said base surfaces free so that each of said fastener strips is adapted to swing hingedly relative to said wall panel material adjacent to its associated pull flange area.

8. A method according to claim 1, wherein said sheet material has two pull flange areas along two edges and said fastener profile closure strip having its base surface hingedly secured to said sheet material at one of said areas, and securing the base surface of a complementary closure strip throughout the major portion of its width to the wall panel material adjacent to the other of said pull flange areas.

9. In apparatus for uninterruptedly assembling components for making bags having opposed sheet material wall panels and an openable mouth defined by pull flanges adapted to be pulled apart for opening the bags:

means for supporting and continuously longitudinally advancing preformed wall panel sheet material having a pull flange area along one edge, and for continuously, at the same speed as said panel sheet material, longitudinally advancing and guiding a preformed extruded plastic flexible interlocking fastener strip having opposite faces, one of said faces having profile means for separably interlocking with complementary profile means on another strip and the other face providing a base surface of substantial width directly opposite said profile means, and joining said base surface in face-to-face relation with a surface of said wall panel material along the inner side of said pull flange area and substantially spaced from said edge;

and means for continuously securing a minor width longitudinally extending portion of said fastener strip base surface adjacent to said pull flange area as a hinge attachment to said wall panel material but leaving the remainder of said base surface free so that said strip is adapted to swing hingedly relative to said wall panel material.

10. Apparatus according to claim 9, wherein said means for securing comprises a source of fusing energy focused toward said sheet material at said minor width portion.

11. Apparatus according to claim 10, wherein said source of fusing energy comprises a hot air delivery system.

12. Apparatus according to claim 10, wherein said source of fusing energy comprises radiant heat delivery means.

13. Apparatus according to claim 9, including means for maintaining said wall panel material and said remainder of said base surface separated while said securing means functions to secure said minor width portion of said base surface to said wall panel material.

14. Apparatus according to claim 9, including means for effecting continuous co-travel of said sheet material and joined profile closure strip, and means for guiding the co-travelling sheet material and closure strip in operative relation to said securing means.

15. Apparatus according to claim 9, wherein said supporting means provide guiding passages for two co-extensive pull flange areas along two respective edges of the wall panel sheet material and for guiding and controlling the position of the first mentioned fastener profile closure strip and a second like closure strip and with the base surface of said first mentioned closure strip in face-to-face relation with the surface of the wall panel material along the inner edge of one of the pull flange areas and the base surface of substantial width of the second closure strip in face-to-face relation with the surface of the wall panel material along the inner edge of the other of the pull flange areas, and said means for securing being operative to secure minor width portions of both of said base surfaces to the wall panel material adjacent to the respective pull flange areas.

16. Apparatus according to claim 9, wherein said means for supporting and joining is adapted for supporting two sheet material wall panel pull flange areas in opposed spaced relation, and also adapted for joining respectively base surfaces of substantial width of like closure strips respectively to the wall panel material along the inner edges of the respective pull flange areas, and said means for securing being operative to secure one of said base surfaces along a minor width portion as a hinge attachment to the wall panel material and for securing the other of said base surfaces to the wall panel material substantially against hinging movement relative to the wall panel material.

17. A method of uninterruptedly assembling components for making bags having sheet material wall panels and an openable mouth defined by pull flanges adapted to be pulled apart for opening the bags providing wall panel sheet material having a pull flange area along an edge;

providing a preformed extruded plastic flexible interlocking closure strip, having a base surface of substantial width;

continuously advancing and guiding and joining said fastener strip base surface into face-to-face relationship with the surface of said wall panel material along the inner side of the pull flange area;

continuously securing a minor width portion of said base surface adjacent to said pull flange area as a hinge attachment to said wall panel material but leaving the remainder of said base surface free so that said strip is adapted to swing hingedly relative to said wall panel material;

and maintaining said wall panel material separated from said remainder of said base surface while effecting securing of said minor width portion.

18. In apparatus for uninterruptedly assembling components for making bags having opposed sheet material wall panels and an openable mouth defined by pull flanges adapted to be pulled apart for opening the bags:

means for supporting a wall panel sheet material having a pull flange area along one edge, and for continuously advancing and guiding and joining a base surface of substantial width of a preformed extruded plastic flexible interlocking fastener closure strip in face-to-face relation with a surface of said wall panel material along the inner edge of a pull flange area of said material;

means for continuously securing a minor width portion of said fastener strip base surface adjacent to said pull flange area as a hinge attachment to said wall panel material but leaving the remainder of said base surface free so that said strip is adapted to swing hingedly relative to said wall panel material;

and means for maintaining said wall panel material and said remainder of said base surface separated while said securing means functions to secure said minor width portion of said base surface to said wall panel material.

* * * * *